(12) United States Patent
Liaw

(10) Patent No.: US 8,350,000 B2
(45) Date of Patent: Jan. 8, 2013

(54) POLYMER AND COPOLYMER AND METHOD OF MAKING THE SAME

(75) Inventor: Der-Jang Liaw, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 38 days.

(21) Appl. No.: 12/848,313

(22) Filed: Aug. 2, 2010

(65) Prior Publication Data

US 2011/0092657 A1   Apr. 21, 2011

(30) Foreign Application Priority Data

Oct. 16, 2009   (TW) ............................... 08135192 A

(51) Int. Cl.
*C08G 73/00*   (2006.01)
(52) U.S. Cl. ........ 528/422; 525/540; 526/171; 526/256; 526/280
(58) Field of Classification Search ................. 528/422; 525/540; 526/171, 256, 280
See application file for complete search history.

(56) References Cited

OTHER PUBLICATIONS

Macromolecules 2010, 43,2236-2243, Chen et al.*

* cited by examiner

*Primary Examiner* — Shane Fang
(74) *Attorney, Agent, or Firm* — Chih Feng Yeh; Huntington IP Consulting Co., Ltd.

(57) ABSTRACT

The present invention discloses a polymer and a copolymer and a method of making the same. The monomer of the polymer of the present invention includes a bi-triphenylamine functional group having a first end and a second end; a fluorene functional group bonded to the first end; and at least two phenyl isopropyl group bonded to the second end.

18 Claims, 19 Drawing Sheets

POLYMER AND COPOLYMER AND METHOD OF MAKING THE SAME

CROSS-REFERENCE TO RELATED APPLICATION

This present application claims priority to TAIWAN Patent Application Serial Number 098135192, filed Oct. 16.2009, which is herein incorporated by reference.

TECHNICAL FIELD

The present invention relates to polymers, and more particularly to polymers with bi-triphenylamine functional groups.

DESCRIPTION OF THE RELATED ART

Electroluminescent devices are now replacing incandescent lamps and gas filling lamps, such that the electroluminescent devices attract people's eyes in its usages in large area solid state light sources. In another aspect, the electroluminescent devices also attract people's eyes in being able to replace the liquid crystal display to be the most powerful self-luminous display in the field of flat panel displays (FPD). In particular, organic electroluminescent devices made by organic materials, which are referred to as the low power full color flat panel display, are being commercialized. Particularly, the polymer electroluminescent devices made by polymer materials will be the indispensable element to the large area organic electroluminescent displays in the future because the polymer electroluminescent devices can be made by performing simple film forming processes for example ink-jet printing and so on in comparison with the low molecular organic electroluminescent devices manufactured by forming film under vacuum.

Until now, the polymer electroluminescent devices can be made by using any one polymer material of the conjugated polymers and the non-conjugated polymers of for example p-phenylene-vinylene. However, the life thereof is very short, so as to become a barrier for constructing the full color displays.

Although polymer organic electroluminescent devices using different kinds of p-type conjugated polymers are proposed in recent years to solve the aforementioned problems, the stability of the above polymer organic electroluminescent devices is still not very well. Therefore, there is still a need for a new organic electroluminescent material which can solve the aforementioned problems.

SUMMARY

To solve the aforementioned problems of conventional organic electroluminescent materials, the present invention provides a new polymer and copolymer and the manufacturing method thereof.

In one aspect, the present invention discloses a polymer, a monomer of which comprises a bi-triphenylamine functional group having a first end and a second end; a fluorene functional group bonded to the first end; and at least two phenyl isopropyl group bonded to the second end.

In another aspect, the present invention discloses a copolymer comprising the structure shown in Formula (III):

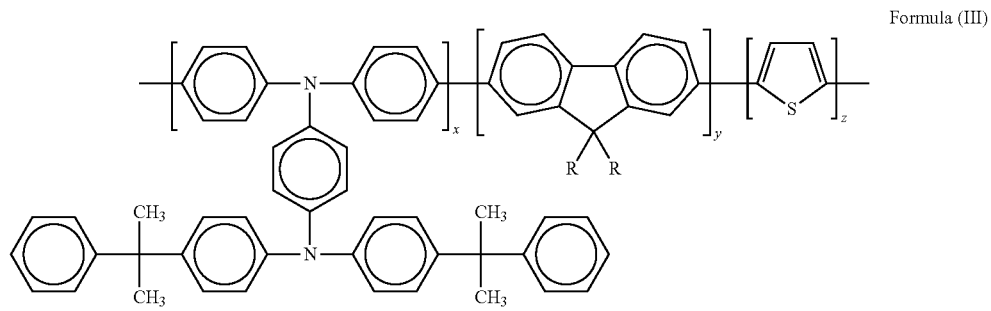

Formula (III)

wherein, R is $C_8H_{17}$~$C_{12}H_{25}$; x is 0.05~0.15; y is 1; and z is 0.85~0.95.

In still another aspect, the present invention discloses a method for manufacturing a polymer, comprising preparing a dibromobenzene compound, a fluoreneboronic acid compound, a potassium carbonate solution and a toluene solution and placing the solution mixture into a reaction vessel filled with nitrogen; adding tetrakis(triphenylphosphine)palladium into the reaction vessel and heating the solution mixture to a first predetermined temperature and refluxing the solution mixture for a first predetermined time; depositing and filtering the polymer in a methanol solution and washing the polymer with a great amount of water; and heating the polymer under vacuum to a second predetermined temperature and drying the polymer for a second predetermined time.

In yet another aspect, the present invention discloses a method for manufacturing a copolymer, comprising preparing a dibromobenzene compound, a fluoreneboronic acid compound, a dibromothiophene compound, a potassium carbonate solution and a toluene solution and placing the solution mixture into a reaction vessel filled with nitrogen; adding tetrakis(triphenylphosphine)palladium into the reaction vessel and heating the solution mixture to a first predetermined temperature and refluxing the solution mixture for a first predetermined time; depositing and filtering the copolymer in a methanol solution and washing the copolymer with a great amount of water; and heating the copolymer under vacuum to a second predetermined temperature and drying the copolymer for a second predetermined time.

One advantage of the present invention is that the polymer and the copolymer of the present invention have good solubility, good heat tolerance, high carrier mobility and low ionization potential.

Another advantage of the present invention is that the polymer and the copolymer of the present invention have good optical properties and good electron donating group properties.

Still another advantage of the present invention is that the absorption of the copolymer of the present invention in the UV-vis spectroscopy will shift toward long wavelength and the absorption efficiency will increase.

These and other advantages will become apparent from the following description of preferred embodiments taken together with the accompanying drawings and the appended claims.

BRIEF DESCRIPTION OF THE DRAWINGS

The present invention may be understood by some preferred embodiments and detailed descriptions in the specification and the attached drawings below. The identical reference numbers in the drawings refer to the same components in the present invention. However, it should be appreciated that all the preferred embodiments of the invention are only for illustrating but not for limiting the scope of the Claims and wherein:

DETAILED DESCRIPTION

Figure 1A:
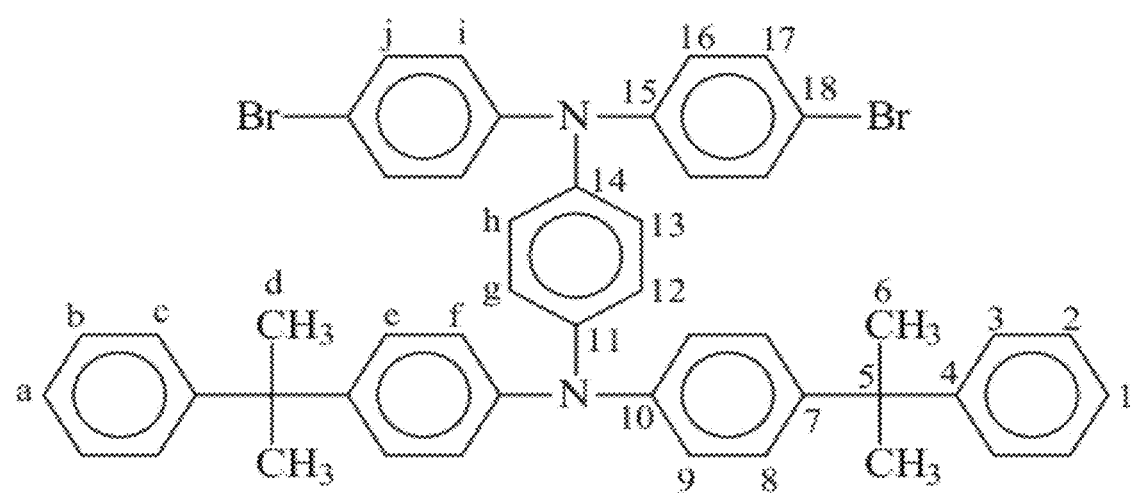
FIGS. 1a and 1b illustrate the $^1$H-NMR spectrum of bis[4-(2-phenyl-2-propyl)phenyl]dibromobenzene compound (BBTPA) in accordance with one embodiment of the present invention.

The invention will now be described with the preferred embodiments and aspects and these descriptions interpret structure and procedures of the invention only for illustrating but not for limiting the Claims of the invention. Therefore, except the preferred embodiments in the specification, the present invention may also be widely used in other embodiments.

The present invention provides a novel polymer having triphenylamine functional groups and a fluorene functional group and a novel copolymer having triphenylamine functional groups, a fluorene functional group and a thiophene functional group and the manufacturing method thereof. The novel polymer and copolymer have good solubility, good heat tolerance, high carrier mobility and low ionization potential because of the triphenylamine functional groups, so as to be able to form thin films easily. Furthermore, the novel polymer and copolymer can be applied to electrochromic materials because the nitrogen atom in the center thereof has oxidation and reduction ability, so as to be able to be applied to windows of buildings, indicators, electrochromic displays, smart windows, etc. Besides, the novel polymer and copolymer can be applied to hole-transporting materials because the nitrogen atom in the center of the triphenylamine functional group thereof is easy to lose electrons, so as to be able to be applied to thin film materials of for example organic light emitting diodes, solar cells, photoreceptors, luminaries, electroluminescent devices, etc. The novel polymer and copolymer have good optical properties and good electron donating group properties because of the fluorene functional group. Moreover, the absorption of the novel copolymer in the UV-vis spectroscopy will shift toward long wavelength and the absorption efficiency will increase because of the thiophene functional group, so as to be able to be applied to solar cell fields.

The manufacturing method of the novel polymer and copolymer is concerned with bis[4-(2-phenyl-2-propyl)phenyl]nitrobenzene compound (BPPAN), bis[4-(2-phenyl-2-propyl)phenyl]aminobenzene compound (BPPAA) and bis[4-(2-phenyl-2-propyl)phenyl]dibromobenzene compound (BBTPA) and utilizes bis[4-(2-phenyl-2-propyl)phenyl]dibromobenzene compound (BBTPA) and fluoreneboronic acid compound to perform the Suzuki coupling reaction to synthesize the novel polymer or utilizes bis[4-(2-phenyl-2-propyl)phenyl]dibromobenzene compound (BBTPA), fluoreneboronic acid compound and dibromothiophene to perform copolymerization to synthesize the novel copolymer.

I. Nitrobenzene Compound

The present invention provides bis[4-(2-phenyl-2-propyl)phenyl]nitrobenzene compound (BPPAN) as shown in Formula (1).

Formula (1)

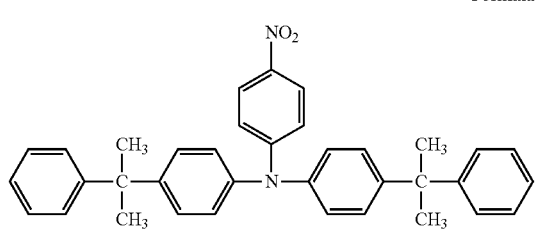

Formula (2)

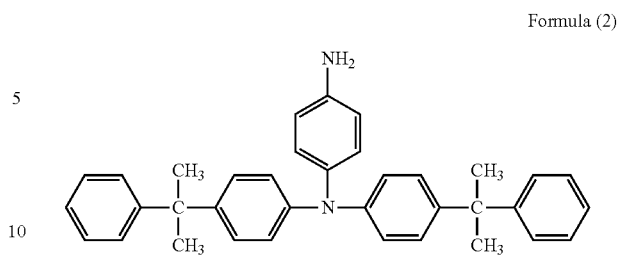

The present invention describes an example to illustrate the manufacturing method for synthesizing BPPAN and to identify and analyze the chemical structure of the produced compound.

First, bis[4-(2-phenyl-2-propyl)phenyl]amine (49 mmol), 1-fluoro-4-nitrobenzene (49 mmol), sodium hydride (49 mmol) and dimethyl sulfoxide (120 mL) are placed into a reaction vessel and the reaction is carried out at temperature of 115~125° C. (preferably at 120° C.) for 48 hours. Subsequently, the cooled mixture is deposited in the methanol. Then, the solid mixture is processed by using column chromatography (elution solvent ratio: n-hexane:dichloromethane=2:1) to obtain a yellow solid (BPPAN). The measured melting point of the nitrobenzene compound (BPPAN) is 150-151° C. and the yield is 50%.

The chemical equation for the above reaction for synthesizing the nitrobenzene compound (BPPAN) is listed below:

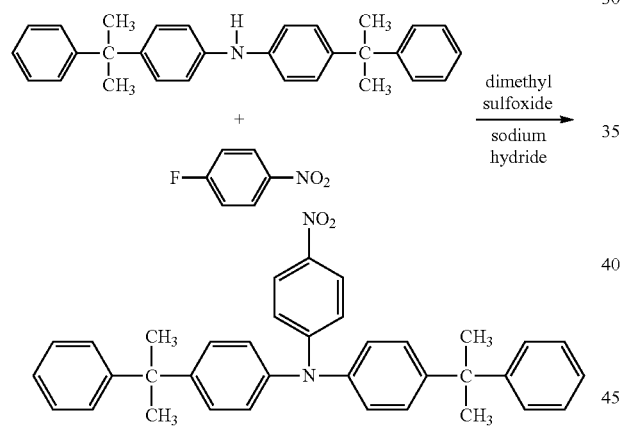

Furthermore, the produced nitrobenzene compound (BPPAN) is identified by using $^1$H-NMR analysis and $^{13}$C-NMR analysis of nuclear magnetic resonance (NMR) spectrum and elemental analysis. In the NMR spectrum, "s" means singlet, "d" means doublet, "t" means triplet, "q" means quartet and "m" means multiplet.

$^1$H NMR. (CDCl$_3$): δ (ppm)=8.05-8.08 (d, 2H); 7.37-7.38 (d, 4H); 7.35-7.36 (t, 4H); 7.28-7.30 (d, 2H); 7.24-7.27 (m, 2H); 7.12-7.14 (d, 4H); 6.93-6.95 (d, 4H); 1.77 (s, 12H).

$^{13}$C NMR (CDCl$_3$): δ (ppm)=153.46, 150.01, 148.26, 142.80, 139.62, 128.13, 128.03, 126.62, 125.88, 125.71, 125.31, 117.42, 42.62, 30.65.

Elemental Analysis:
Theoretical value: C, 82.10%; H, 6.51%; N, 5.32%;
Analysis value: C, 81.87%; H, 6.39%; N, 5.21%.

II. Aminobenzene Compound

The aminobenzene compound of the present invention is bis[4-(2-phenyl-2-propyl)phenyl]aminobenzene compound (BPPAA) shown in Formula (2).

The present invention describes an example to illustrate the manufacturing method for synthesizing BPPAA and to identify and analyze the chemical structure of the produced compound.

First, bis[4-(2-phenyl-2-propyl)phenyl]nitrobenzene compound (BPPAN) monomer (33.46 mmol), 10% Pd/C (0.3 g) and ethanol (200 mL) are placed into a reaction vessel and are then heated to temperature of 85~95° C. (preferably to 90° C.). Hydrazine (H$_2$NNH$_2$.H$_2$O) (10 mL) is added slowly and then the reaction is carried out for 24 hours. Subsequently, the formed mixture is filtered while hot to remove 10% Pd/C and obtain the filtrate after the reaction is completed. After the filtrate is cooled, the solid product is precipitated and the mixture is filtered again to obtain solid product. Then, the solid product is recrystallized twice by using ethanol to obtain white aminobenzene compound. The white aminobenzene compound is dried under vacuum. The measured melting point of the aminobenzene compound (BPPAA) is 110-112° C. and the yield is 66%.

The chemical equation for the above reaction for synthesizing the aminobenzene compound (BPPAA) is listed below:

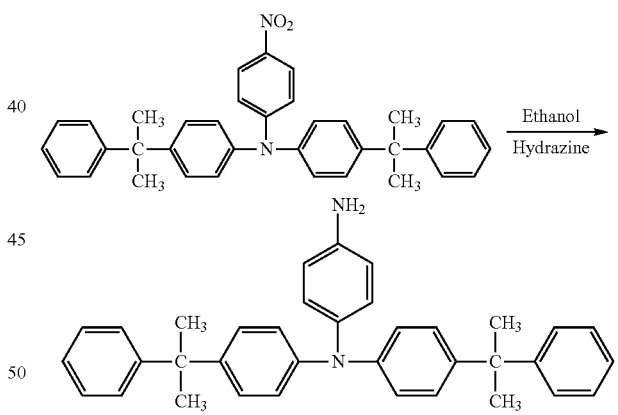

Furthermore, the produced aminobenzene compound (BPPAA) is identified by using $^1$H-NMR analysis and $^{13}$C-NMR analysis of nuclear magnetic resonance (NMR) spectrum and elemental analysis.

$^1$H NMR. (DMSO-d$_6$): δ (ppm)=7.20-7.21 (d, 4H); 7.19-7.20 (d, 4H); 7.09-7.12 (m, 2H); 6.98-7.00 (d, 2H); 6.79 (d, 4H); 6.77 (d, 4H); 6.56-6.58 (d, 2H); 5.02 (s, 2H); 1.57 (s, 12H).

$^{13}$C NMR (DMSO-d$_6$): δ (ppm)=150.3, 145.9, 145.4, 142.5, 135.2, 127.9, 127.8, 126.9, 126.2, 125.3, 120.7, 114.9, 41.7, 30.3.

Elemental Analysis:
Theoretical value: C, 87.05%; H, 7.31%; N, 5.64%;
Analysis value: C, 86.9%; H, 7.13%; N, 5.61%.

III. Dibromobenzene Compound

The dibromobenzene compound of the present invention is bis[4-(2-phenyl-2-propyl)phenyl]dibromobenzene compound (BBTPA) shown in Formula (3).

Formula (3)

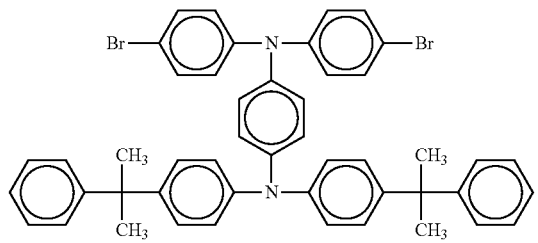

The present invention describes an example to illustrate the manufacturing method of BBTPA and to identify and analyze the chemical structure of the produced compound.

First, 1-bromo-4-iodobenzene (14 mmol), bis[4-(2-phenyl-2-propyl)phenyl]aminobenzene compound (BPPAA) (6 mmol), tris(dibenzylideneacetone)-dipalladium ($Pd_2(dba)_3$) (0.36 mmol), bis(diphenylphosphino)ferrocene (DPPF) (0.72 mmol), sodium tert-butoxide (27 mmol) and anhydrous toluene (10 mL) are placed into a 250 mL three-port reaction vessel, and a condensation tube is installed on the three-port reaction vessel. The mixture is then heated to reflux under nitrogen atmosphere and the reaction is carried out for 6 hours. After the reaction is completed, the toluene is removed and the organic phase is extracted by using dichloromethane and water. After the organic phase is dried by the magnesium sulfate and the mixture is filtered, the solvent is removed. The solid mixture is purified by using column chromatography (elution solvent ratio: toluene:n-hexane=1:4), and is then recrystallized by using ethyl acetate to obtain a white dibromobenzene compound (BBTPA) in a 65% yield. The measured melting point of the dibromobenzene compound (BBTPA) is 225° C.

The chemical equation for the above reaction for synthesizing the dibromobenzene compound (BBTPA) is listed below:

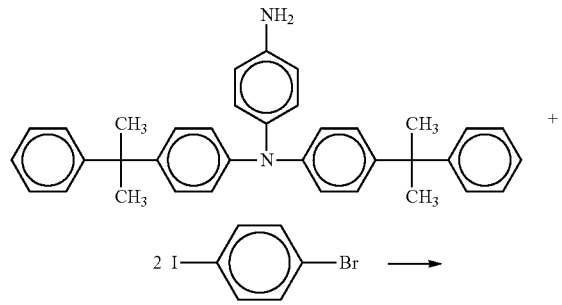

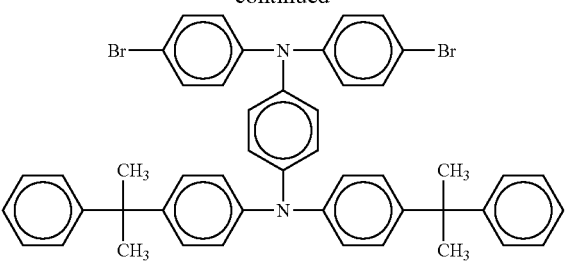

Furthermore, the produced dibromobenzene compound (BBTPA) is identified by using $^1$H-NMR analysis and $^{13}$C-NMR analysis of nuclear magnetic resonance (NMR) spectrum and elemental analysis. In the NMR spectrum, "s" means singlet, "d" means doublet, "t" means triplet, "q" means quartet and "m" means multiplet.

$^1$H NMR. ($CDCl_3$): δ (ppm)=1.71 (s, 12H); 6.92-6.97 (m, 6H); 6.99-7.01 (m, 6H); 7.12-7.13 (d, 4H); 7.18-7.22 (m, 2H); 7.30-7.32 (d, 8H); 7.34-7.36 (d, 4H).

$^{13}$C NMR ($CDCl_3$): δ (ppm)=30.7, 42.5, 114.9, 123.4, 124.7, 124.8, 125.6, 125.9, 126.73, 127.5, 128.0, 132.2, 140.9, 144.1, 144.9, 145.0, 146.6, 150.6.

Figure 1B:
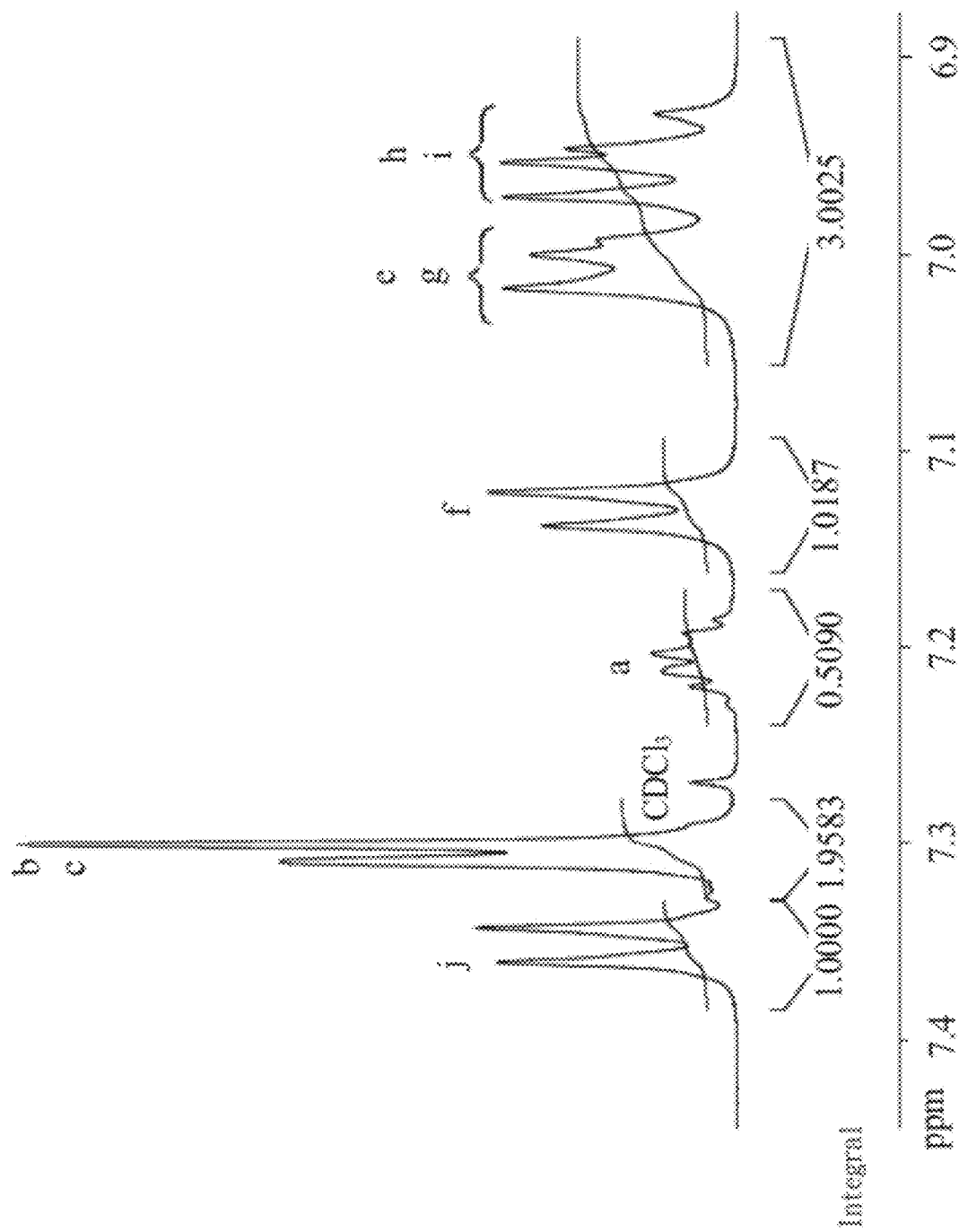
Figure 2A:
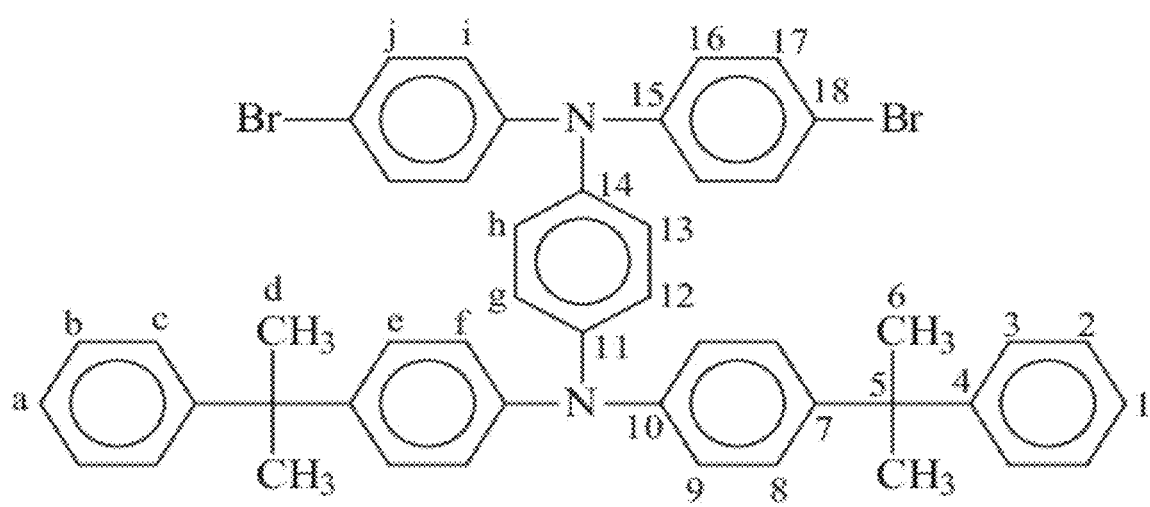
FIGS. 2a and 2b illustrate the $^{13}$C-NMR spectrum of bis[4-(2-phenyl-2-propyl) phenyl]dibromobenzene compound (BBTPA) in accordance with one embodiment of the present invention.
Figure 2B:
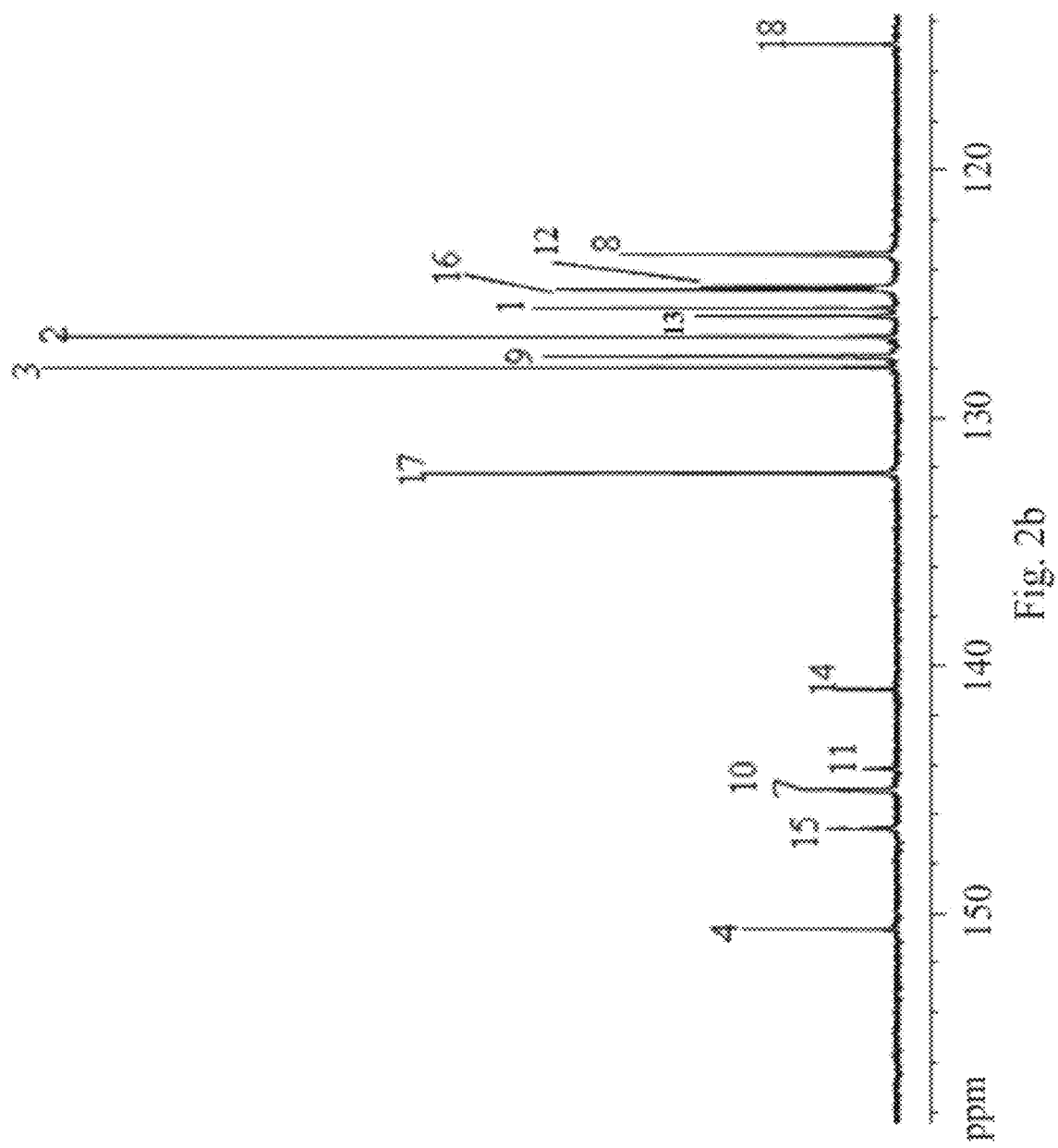
Figure 3A:
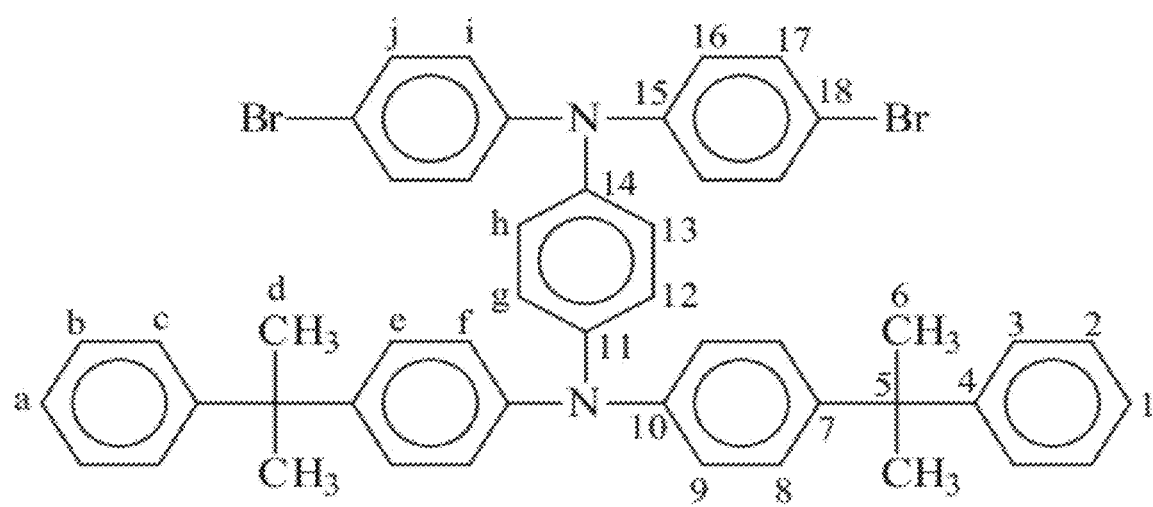
FIGS. 3a and 3b illustrate the 2D-COSY spectrum of bis[4-(2-phenyl-2-propyl) phenyl]dibromobenzene compound (BBTPA) in accordance with one embodiment of the present invention.
Figure 3B:
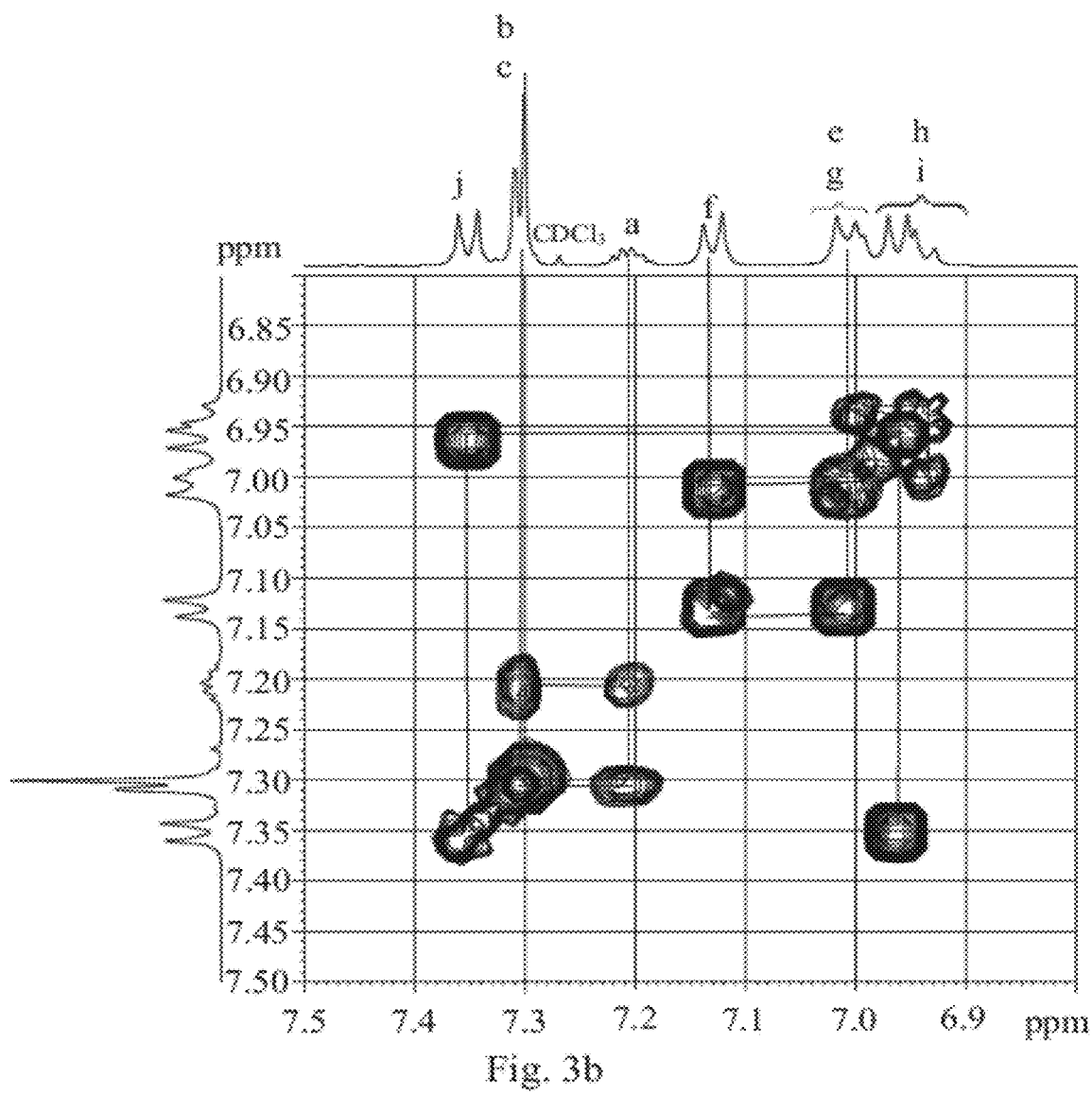
Figure 4A:
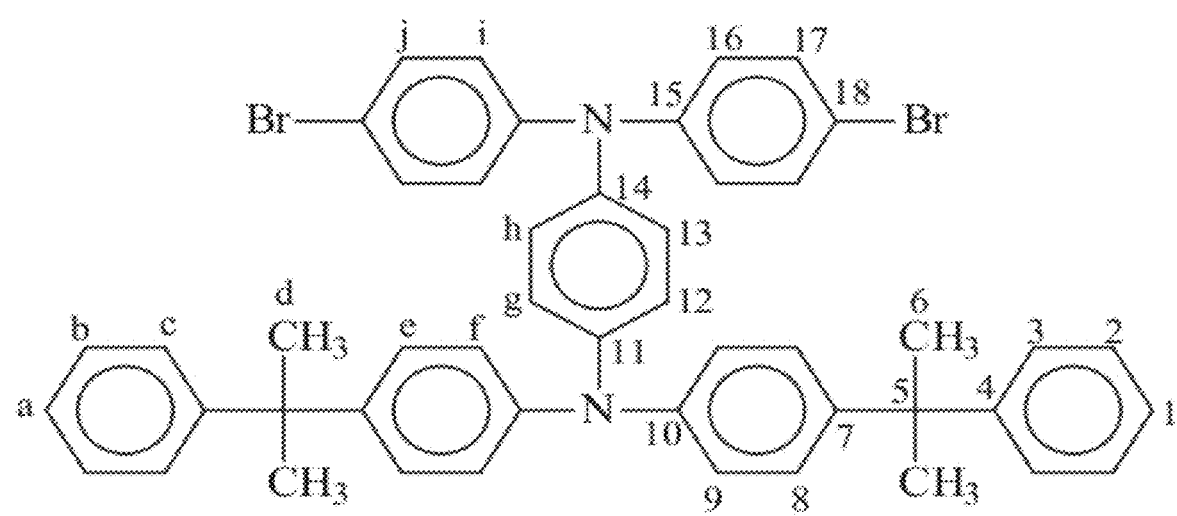
FIGS. 4a and 4b illustrate the 2D-HMQC spectrum of bis[4-(2-phenyl-2-propyl)phenyl]dibromobenzene compound (BBTPA) in accordance with one embodiment of the present invention.
Figure 4B:
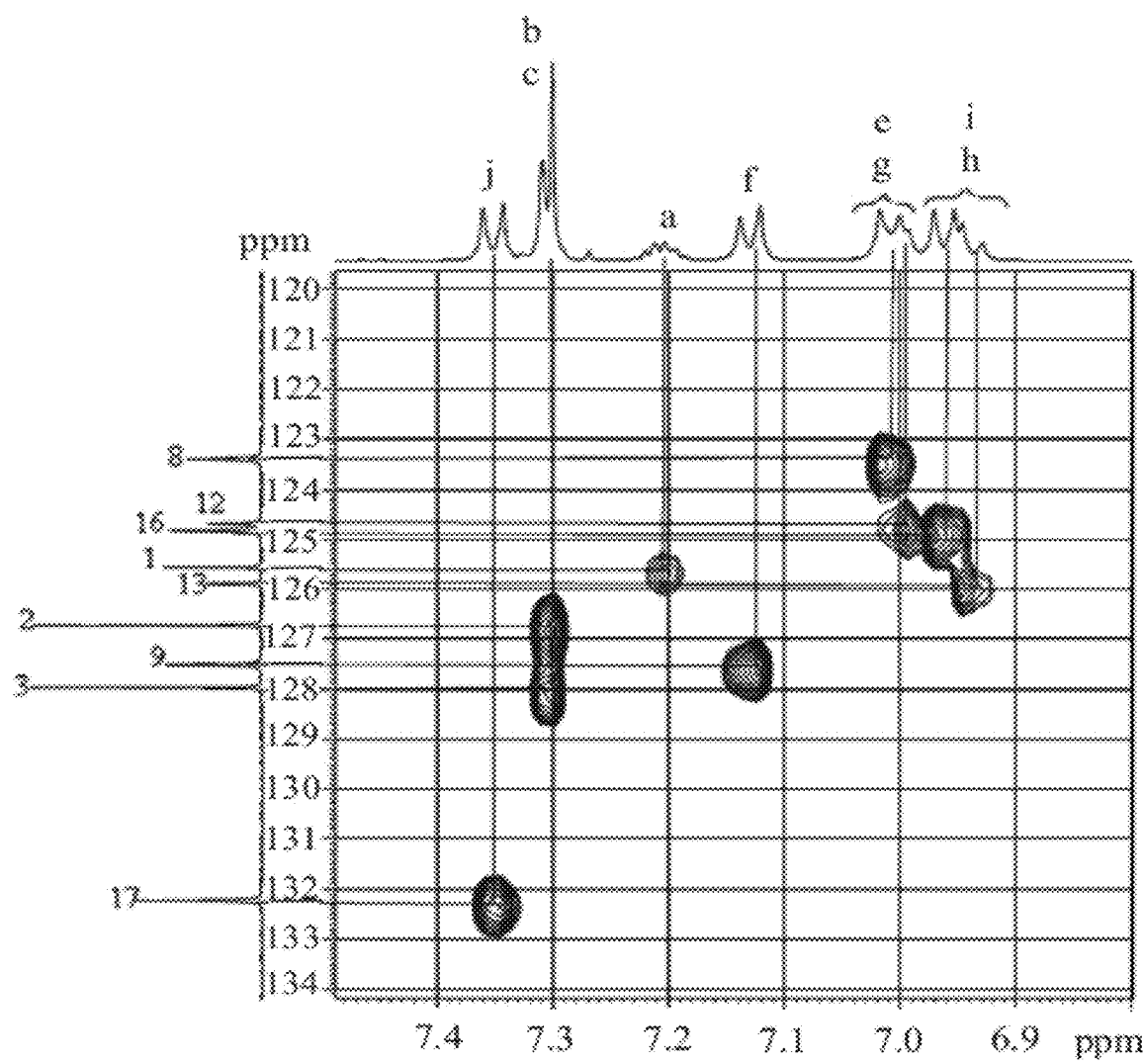

FIGS. 1a and 1b illustrate the result of $^1$H-NMR analysis, and FIGS. 2a and 2b illustrate the result of $^{13}$C-NMR analysis. FIG. 3 illustrates 2D-COSY spectrum of bis[4-(2-phenyl-2-propyl)phenyl]dibromobenzene compound (BBTPA). FIG. 4 illustrates 2D-HMQC spectrum of bis[4-(2-phenyl-2-propyl)phenyl]dibromobenzene compound (BBTPA).

Elemental Analysis:

Theoretical value: C, 71.47; H, 5.25; N, 3.47%;

Analysis value: C, 72.00; H, 5.30; N, 3.09%.

IV. Poly-bis[4-(2-phenyl-2-propyl)phenyl]dioctylfluorene (PBTPAFL)

The polymer of the present invention is the structure shown in Formula (5). The polymer is manufactured by utilizing the dibromobenzene compound (BBTPA) shown in Formula (3) and the boronic acid compound shown in Formula (4) as the monomer and performing the Suzuki coupling reaction.

Formula (4)

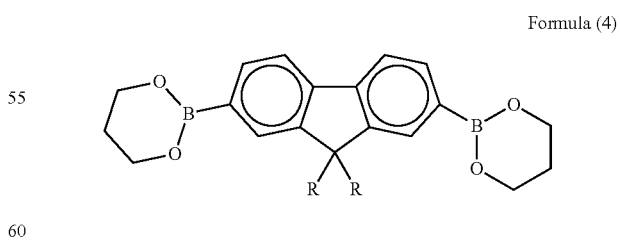

The compound of Formula (4) may be 9,9-dioctylfluorene-2,7-diboronic acid bis(1,3-propanediol) ester or 9,9-didodecylfluorene-2,7-diboronic acid bis(1,3-propanediol) ester, wherein R may be $C_8H_{17}$~$C_{12}H_{25}$ and preferably is $C_8H_{17}$ or $C_{12}H_{25}$.

Formula (5)

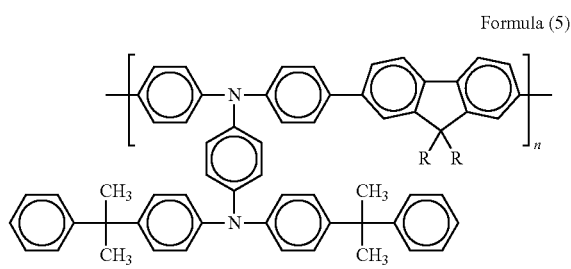

The compound of Formula (5) may be poly-bis[4-(2-phenyl-2-propyl)phenyl]dioctylfluorene (PBTPAFL) or poly-bis[4-(2-phenyl-2-propyl)phenyl]didodecylfluorene (Poly(BP-PAFL12)), wherein R may be $C_8H_{17}$~$C_{12}H_{25}$ and preferably is $C_8H_{17}$ or $C_{12}H_{25}$ and n is 5~30.

As shown in Formula (5), in one embodiment of the present invention, the present invention discloses a polymer, the monomer of which includes a bi-triphenylamine functional group having a first end and a second end; a fluorene functional group bonded to the first end; and at least two phenyl isopropyl group bonded to the second end.

Example 1

Synthesis of poly-bis[4-(2-phenyl-2-propyl)phenyl]dioctylfluorene (PBTPAFL)

Figure 10:
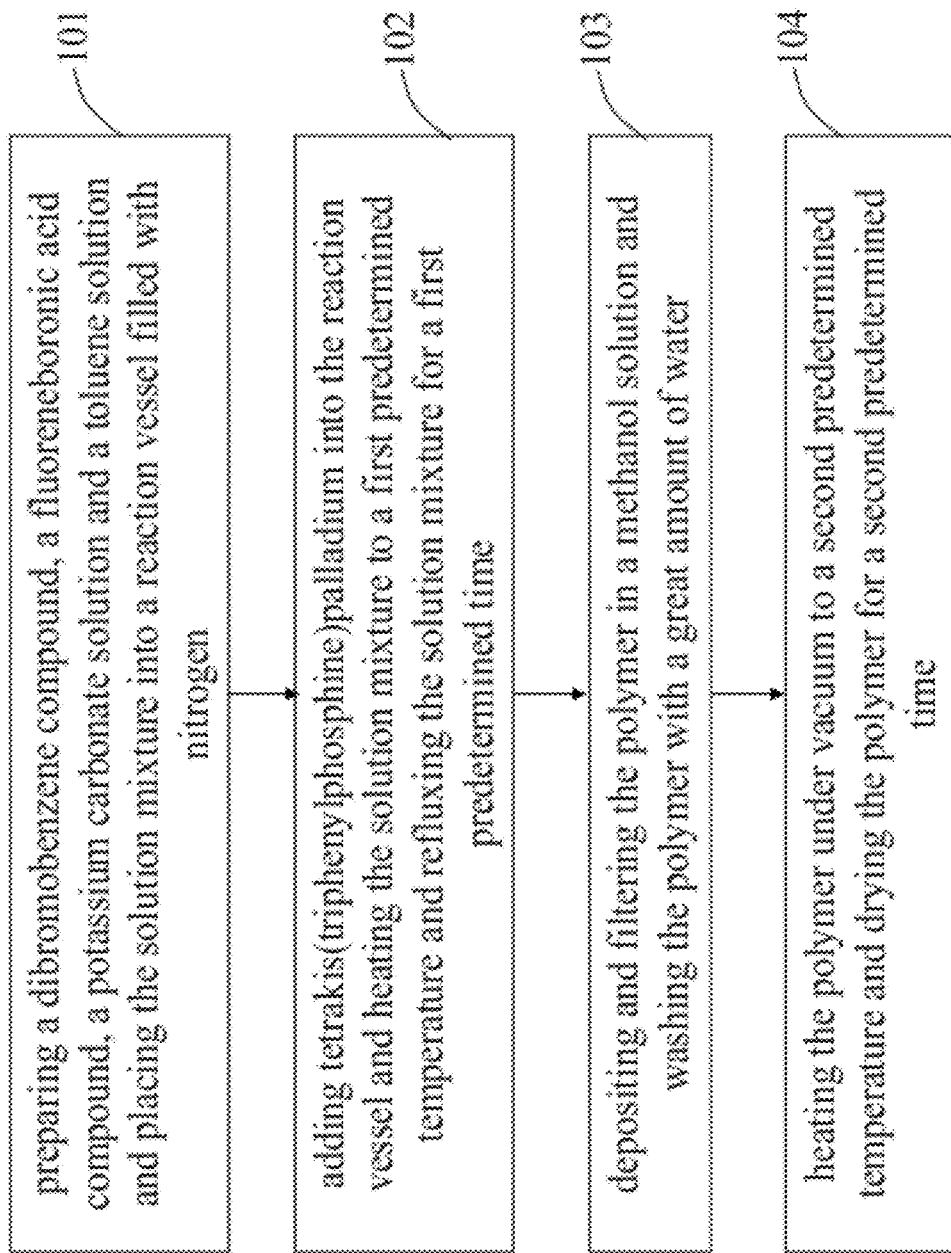
FIG. 10 illustrates the flow diagram of the method for manufacturing polymer in accordance with one embodiment of the present invention.

As shown in FIG. 10, in step 101, the dibromobenzene compound (BBTPA) (0.92 mmol), fluoreneboronic acid compound (9,9-dioctylfluorene-2,7-diboronic acid bis(1,3-propanediol) ester) (0.92 mmol), 3M potassium carbonate solution ($K_2CO_{3(aq)}$) (0.918 mL) and toluene (20 mL) are placed into a reaction vessel filled with nitrogen. Then, in step 102, tetrakis(triphenylphosphine)palladium ($Pd(PPh_3)_4$) (0.6 mmol) is added and the solution mixture is heated to temperature of 100~110° C. (preferably to 105° C.) and is refluxed for 48 hours. Subsequently, in step 103, the polymer solution is deposited in 1 liter of methanol solution. The product is washed with a great amount of water after the solution is filtered. Then, the product is dissolved in toluene again and is deposited in 1 liter of methanol solution and repeat three times. Subsequently, in step 104, the product is heated to temperature 145~155° C. (preferably to 150° C.) under vacuum and is dried for 24 hours. The yield is 92%.

Figure 5:
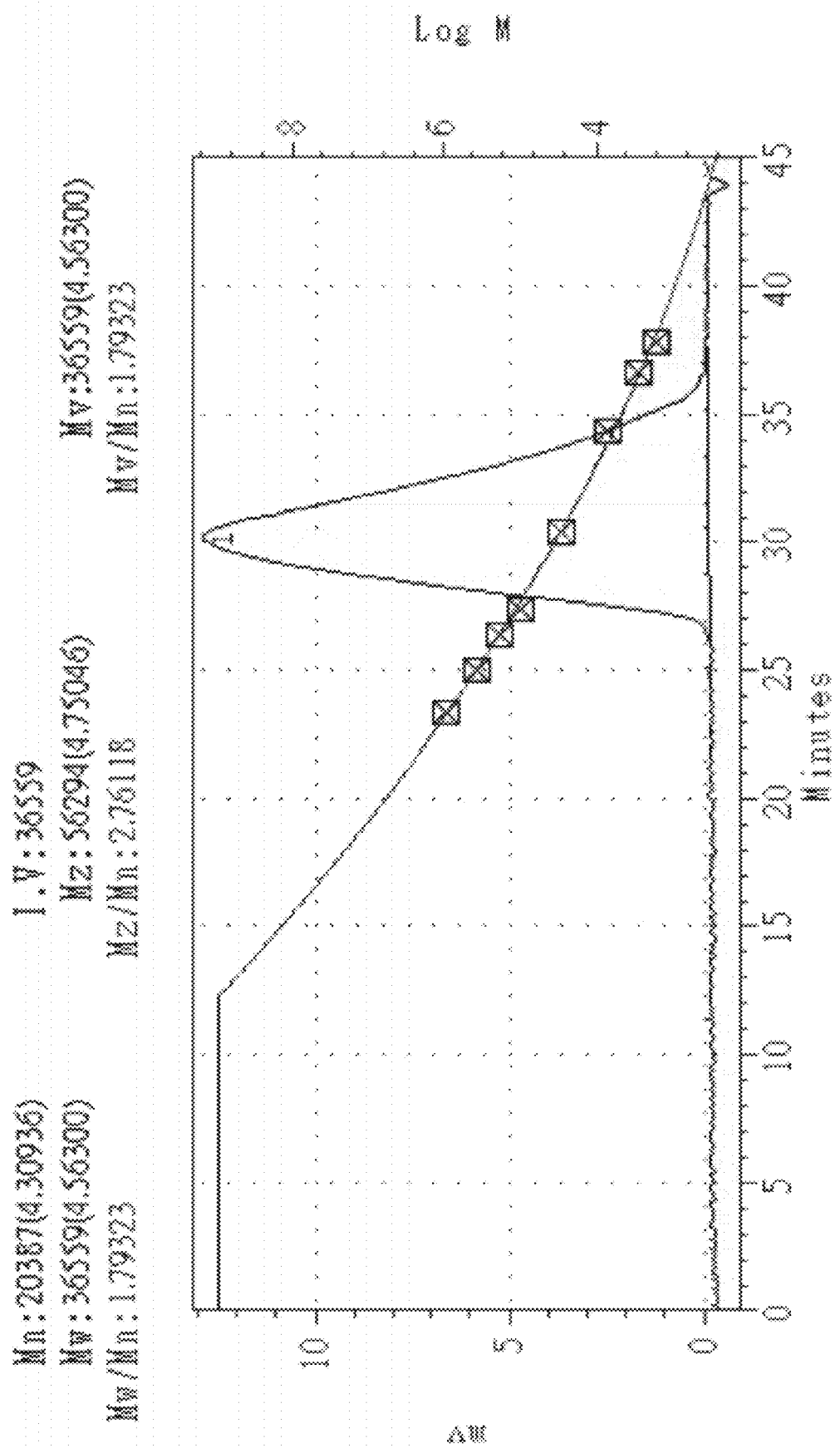
FIG. 5 illustrates the GPC diagram of poly-bis[4-(2-phenyl-2-propyl)phenyl]dioctylfluorene (PBTPAFL) in accordance with one embodiment of the present invention.

The produced poly-bis[4-(2-phenyl-2-propyl)phenyl]dioctylfluorene (PBTPAFL) is identified by using $^1$H-NMR analysis and $^{13}$C-NMR analysis of nuclear magnetic resonance (NMR) spectrum. FIG. 5 illustrates GPC (Gel Permeation Chromatography) diagram of poly-bis[4-(2-phenyl-2-propyl)phenyl]dioctylfluorene (PBTPAFL).

$^1$H NMR. ($CDCl_3$): Γ (ppm)=0.75 (4H); 0.79-0.82 (6H); 1.08-1.22 (20H); 1.68 (12H); 2.05 (4H); 7.03-7.06 (6H); 7.11 (6H); 7.17-7.20 (4H); 7.26 (2H); 7.28-7.30 (8H); 7.57-7.60 (8H); 7.75-7.77 (2H).

$^{13}$C NMR ($CDCl_3$): δ (ppm)=14.06, 22.59, 23.82, 25.61, 29.21, 29.22, 30.05, 30.77, 31.78, 40.50, 42.47, 55.21, 67.96, 119.88, 120.90, 123.15, 123.69, 125.22, 125.49, 125.55, 125.90, 126.77, 127.49, 127.78, 127.97, 135.48, 139.36, 139.74, 144.70, 145.29, 146.93, 150.75, 151.63.

Figure 6:
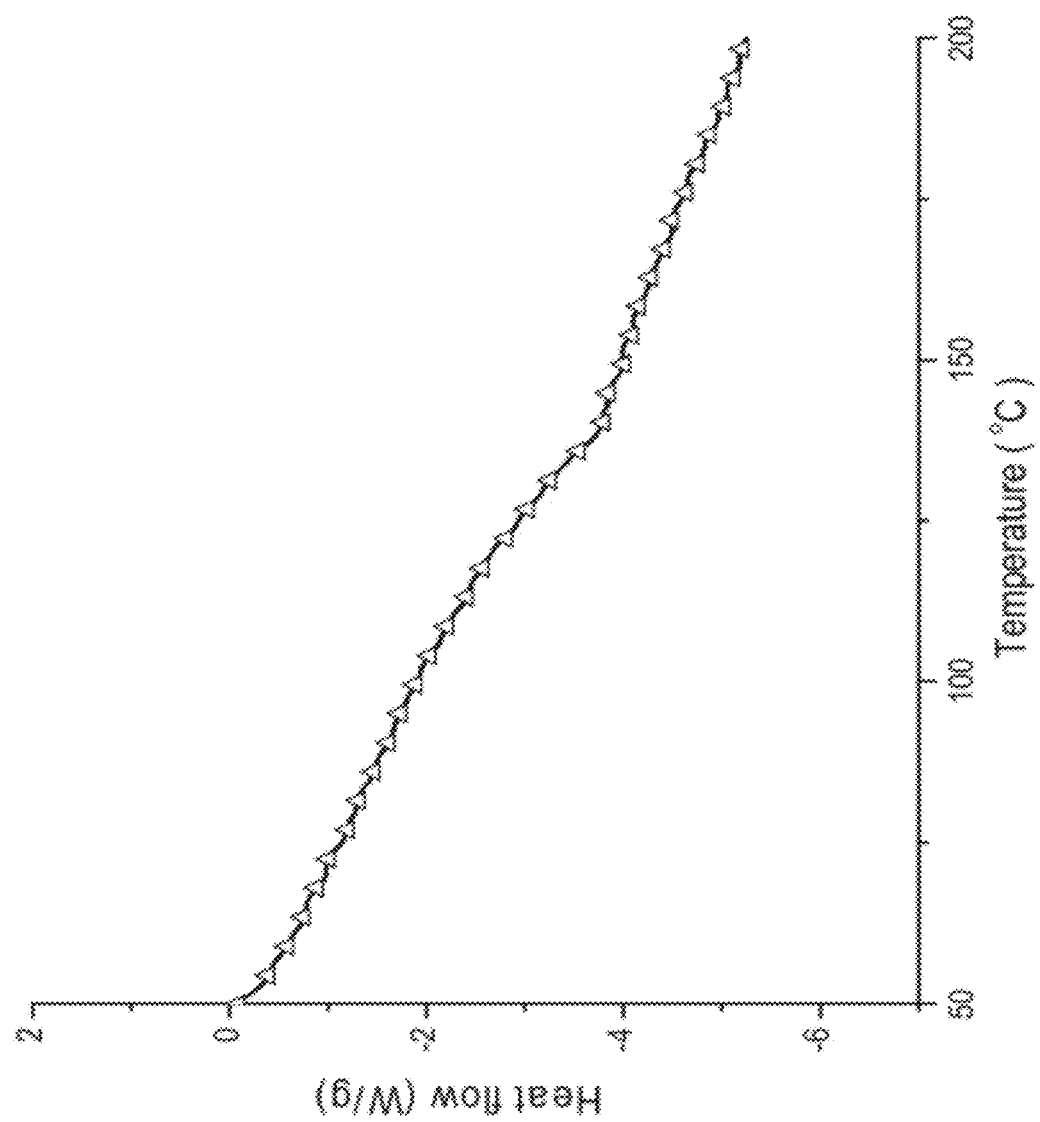
FIG. 6 illustrates the DSC (Differential Scanning Calorimetry) diagram of poly-bis[4-(2-phenyl-2-propyl)phenyl]dioctylfluorene (PBTPAFL) in accordance with one embodiment of the present invention.
Figure 7:
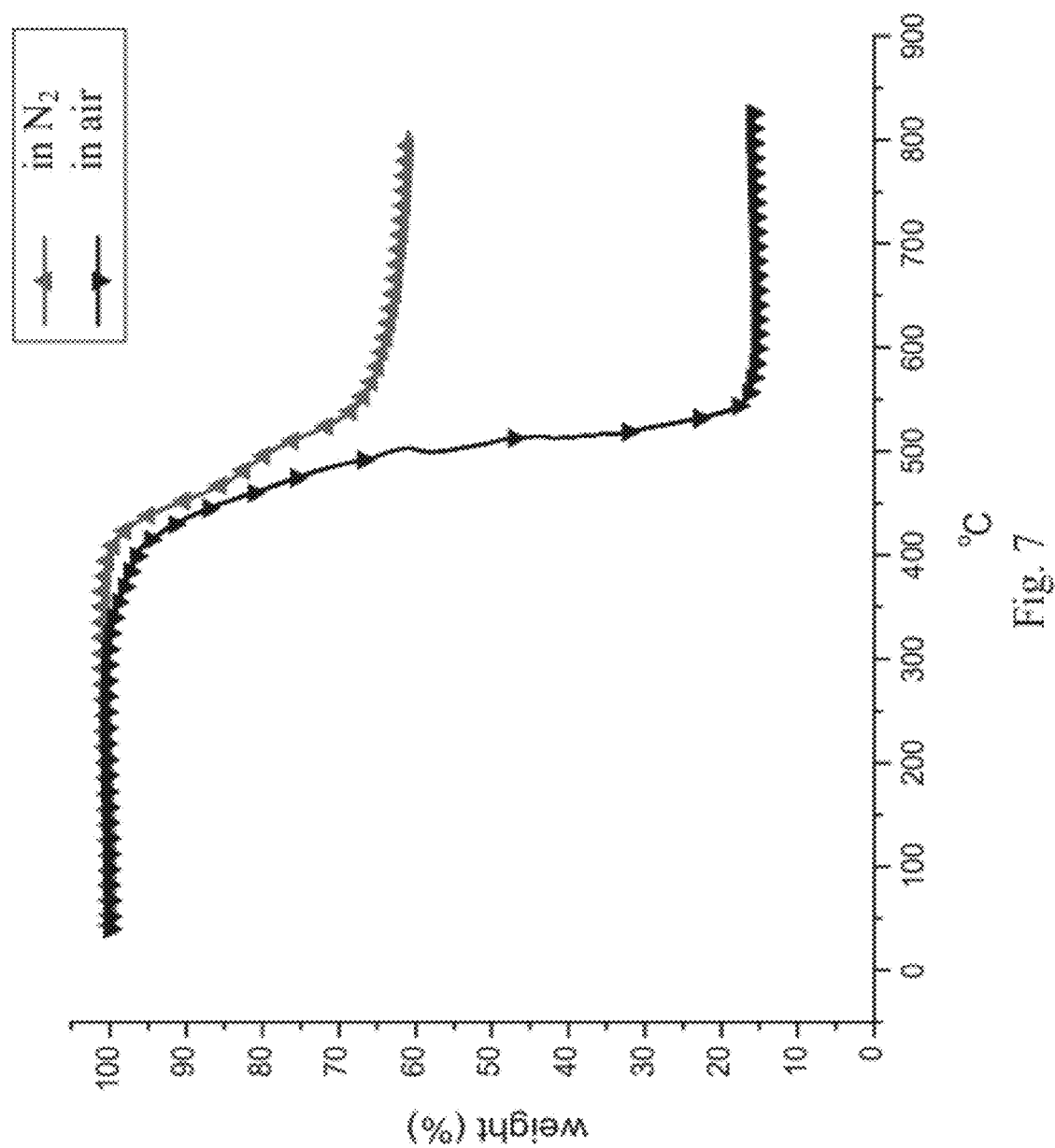
FIG. 7 illustrates the TGA diagram of poly-bis[4-(2-phenyl-2-propyl)phenyl]dioctylfluorene (PBTPAFL) in accordance with one embodiment of the present invention.

As shown in FIGS. 6 and 7, the thermal degradation temperature (at 10 wt % loss) ($T_{d10}$) of the poly-bis[4-(2-phenyl-2-propyl)phenyl]dioctylfluorene (PBTPAFL) measured under air by TGA (thermal gravimetric analysis) is 435° C. The thermal degradation temperature (at 10 wt % loss) ($T_{d10}$) of the poly-bis[4-(2-phenyl-2-propyl)phenyl]dioctylfluorene (PBTPAFL) measured under nitrogen by TGA (thermal gravimetric analysis) is 453° C. The glass transition temperature (Tg) of the poly-bis[4-(2-phenyl-2-propyl)phenyl]dioctylfluorene (PBTPAFL) measured at nitrogen flow rate of 10 mL/min is 137° C.

Figure 8:
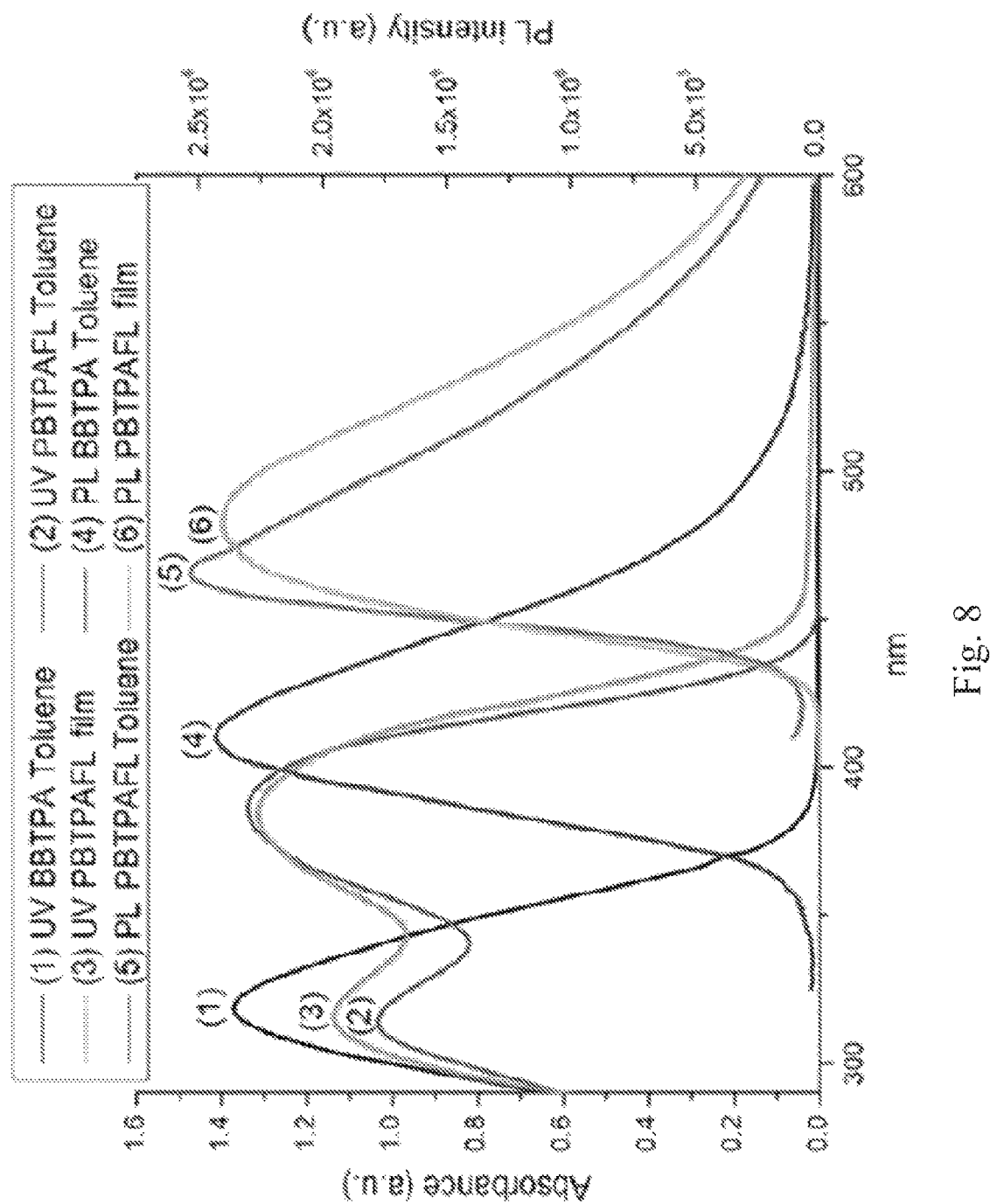
FIG. 8 illustrates the UV-vis spectroscopies and PL spectra of poly-bis[4-(2-phenyl-2-propyl)phenyl]dioctylfluorene (PBTPAFL) in accordance with one embodiment of the present invention.

As shown in FIG. 8, the absorption peak of the ultraviolet (UV) spectrum of the poly-bis[4-(2-phenyl-2-propyl)phenyl]dioctylfluorene (PBTPAFL) in tetrahydrofuran (THF) solution is 313 nm and 387 nm. The peak of the photoluminescence (PL) spectrum of the poly-bis[4-(2-phenyl-2-propyl)phenyl]dioctylfluorene (PBTPAFL) in tetrahydrofuran (THF) solution is 451 nm. The absorption peak of the ultraviolet (UV) spectrum of the poly-bis[4-(2-phenyl-2-propyl)phenyl]dioctylfluorene (PBTPAFL) in the solid state is 319 nm and 388 nm. The peak of the photoluminescence (PL) spectrum of the poly-bis[4-(2-phenyl-2-propyl)phenyl]dioctylfluorene (PBTPAFL) in the solid state is 466 nm.

Figure 9:
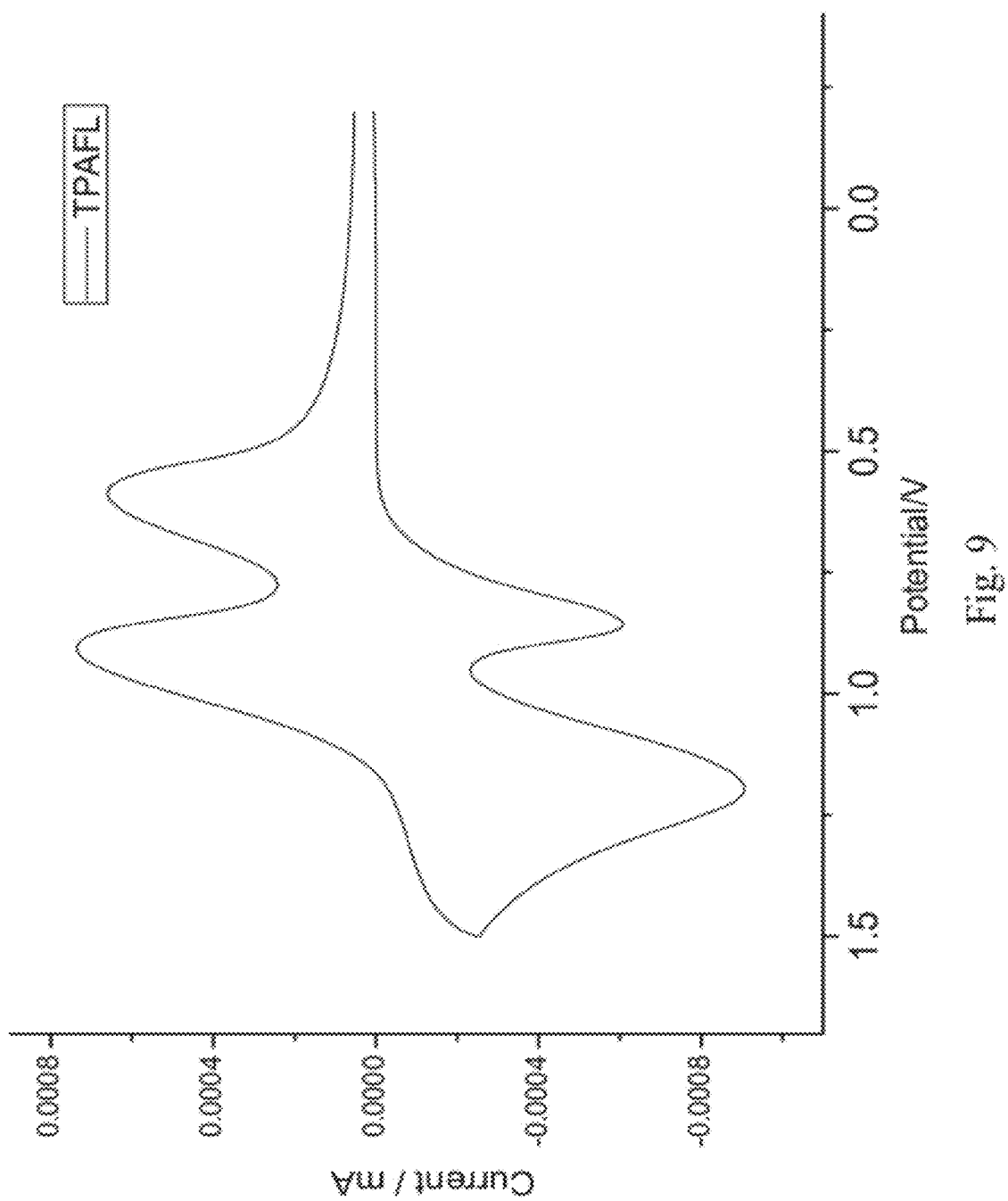
FIG. 9 illustrates the CV diagram of poly-bis[4-(2-phenyl-2-propyl)phenyl]dioctylfluorene (PBTPAFL) in accordance with one embodiment of the present invention.

As shown in FIG. 9, the polymer also has electrochemical properties, such that CV (cyclic voltammetry) method can be utilized to research the properties of the polymer. From the oxidation potential relative to ferrocene/ferrocenenium, corresponding to −4.8 eV for ferrocene below the vacuum level, the HOMO energy level of the conjugated polymer can be approximately calculated. Therefore, the lowest unoccupied molecular orbital (LUMO) can be calculated from the following equation: LUMO=HOMO+$E_g$. The values of the HOMO and the LUMO of the poly-bis[4-(2-phenyl-2-propyl)phenyl]dioctylfluorene (PBTPAFL) in tetrahydrofuran (THF) solution can be calculated to be −4.93 eV and −2.12 eV.

Figure 12:
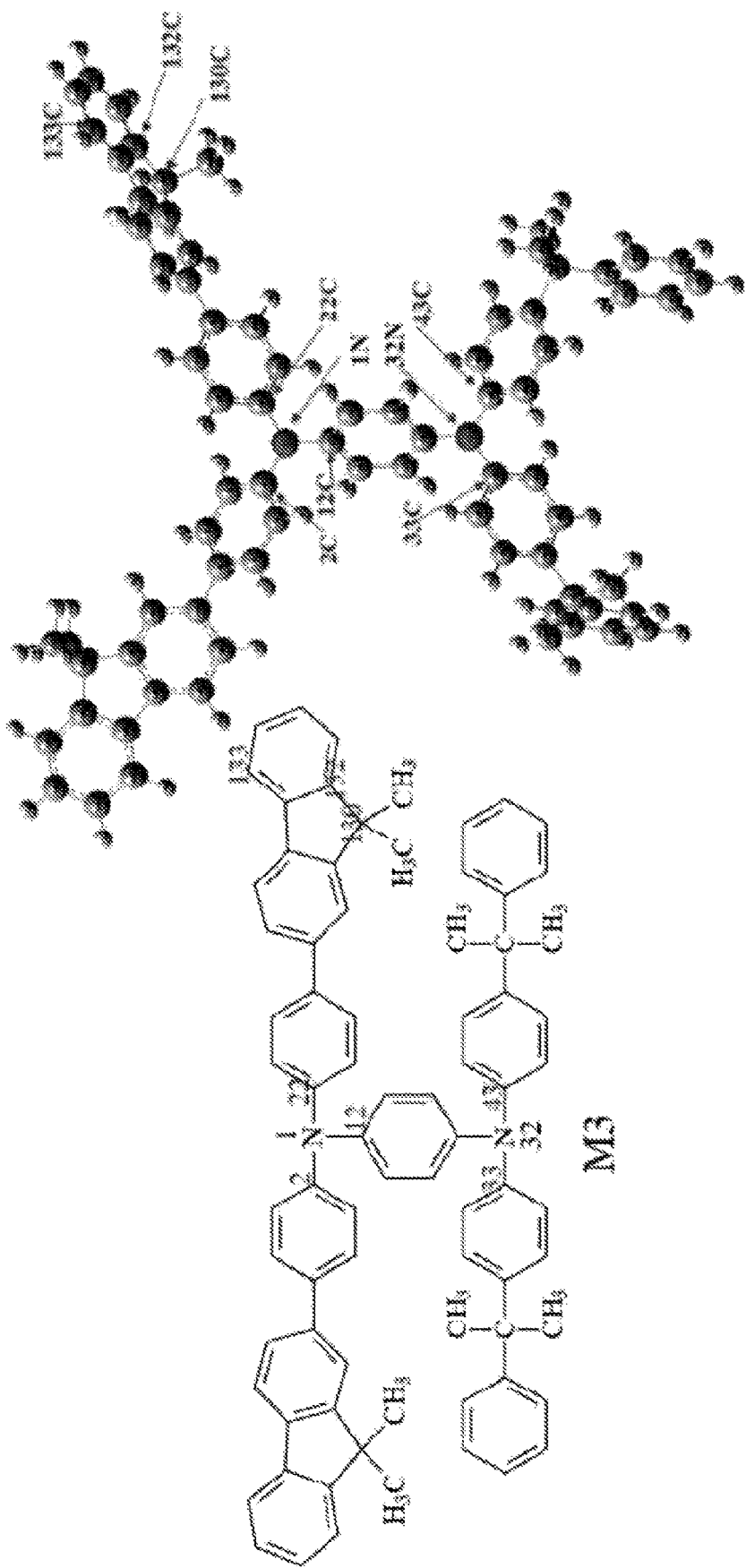
FIG. 12 illustrates the sketch map of the studied structure (named as M3) and optimized structure by DFT/B3LYP/6-31G*.
Figure 13:
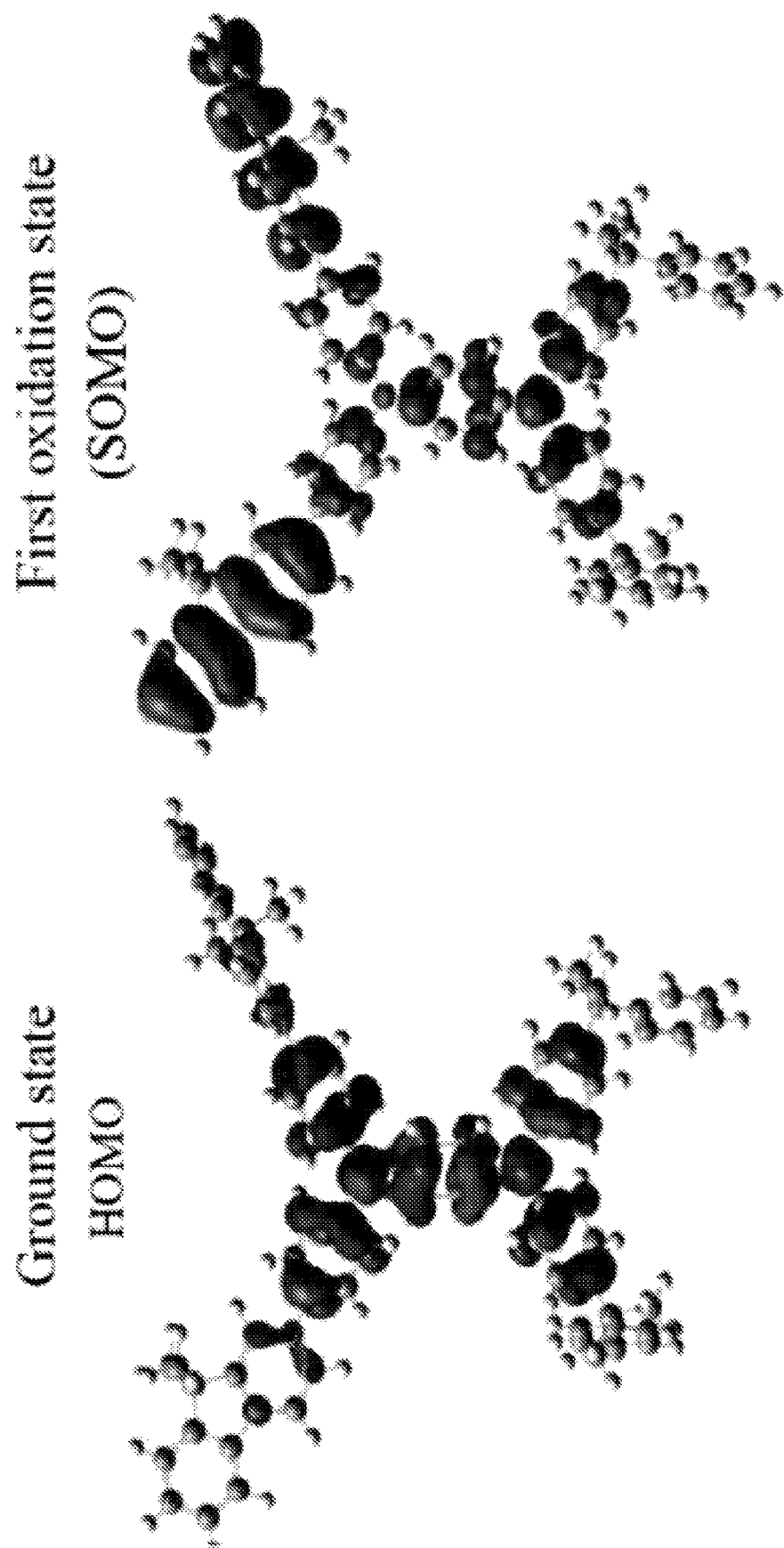
FIG. 13 illustrates electronic density contours of the frontier orbitals for optimized PBTPAFL at ground state and first oxidation state.

All theoretical calculations in the present invention are carried out using quantum mechanical package Gaussian 03. Equilibrium structure for each fluorene-based polymer is determined using DFT with the B3LYP functional and the 6-31G* basis set. It has been shown that B3LYP/6-31G* gives decent ground state structures of conjugated polymers. The sketch map of the studied basic structure (named as M3) and optimized structure by B3LYP/6-31G* are illustrated in FIG. 12. The main atomic charge differences were located on 1N, 2C, 12C, 22C 32N, 33C, 43C atoms. For the first oxidation (losing first electron), the 1N, 12C and 32N atoms contribute 4.1%, 3.3% and 3.6% electron, while the 2C, 22C, 33C and 43C get 3.2%, 4%, 3.6% and 3.9% electron, respectively. For the second oxidation, the 1N, 32N, 132C and 133C atoms contribute 1.5%, 1.6%, 1.8% and 1.5% electron, while the 12C and 130C get 1.7% and 3.6% electron, respectively. The electron density contour of ground state and oxidation states are illustrated by Gauss View as shown in FIG. 13. The first electron was removed from HOMO to form single occupied molecular orbital (SOMO), and the second electron was removed from SOMO to form second oxidation state. That is, the electron removal (oxidation) of the molecule was contributed by the all atoms in the HOMO (first oxidation) or SOMO (second oxidation) of the molecule but not only by nitrogen atom.

Figure 14:
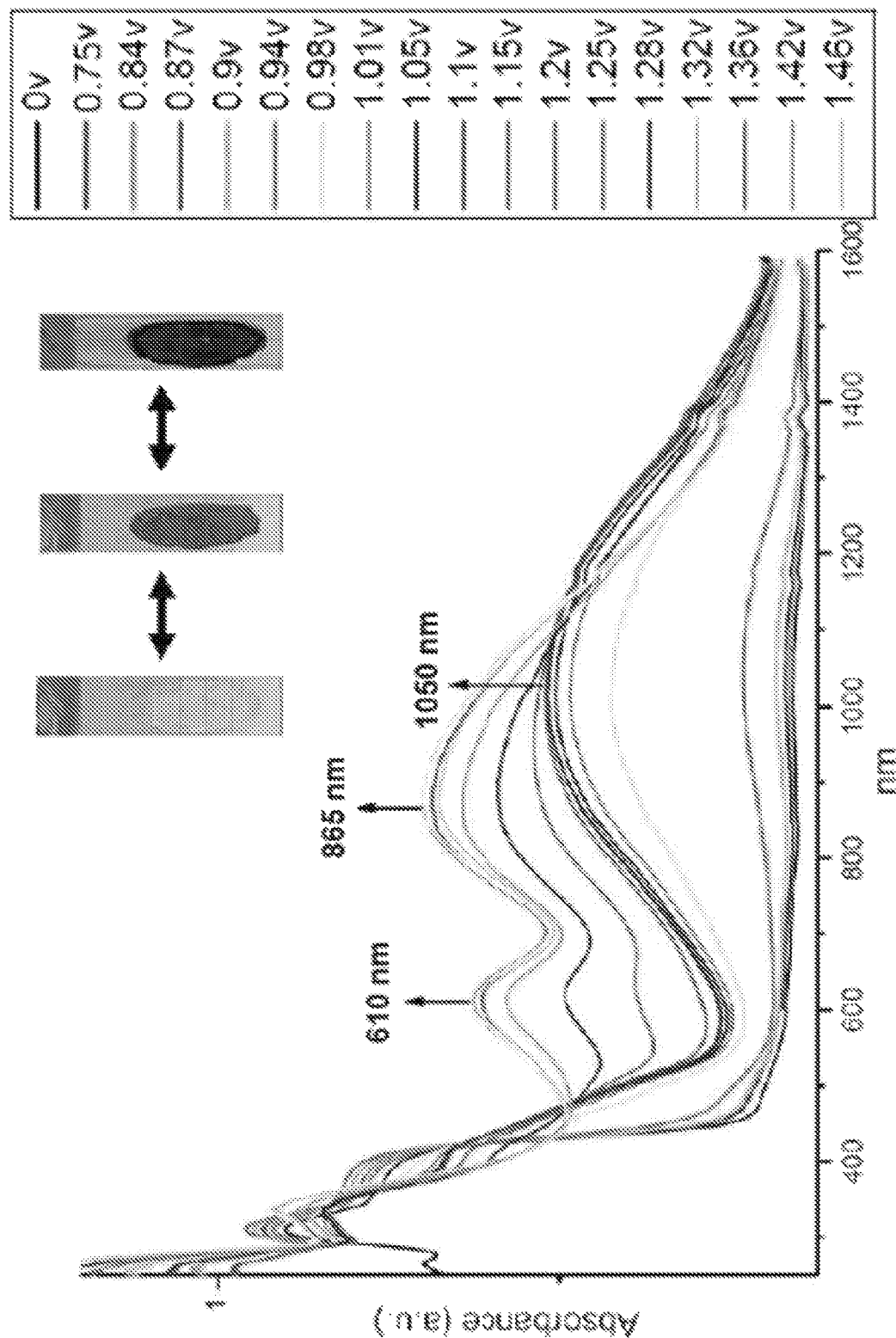
FIG. 14 illustrates electrochromic behavior of PBTPAFL thin film (in $CH_3CN$ with 0.1 M TBAP as the supporting electrolyte) from 0 V to 1.46 V (V vs. Ag/Ag$^+$)

The typical electrochromic absorbance spectrum of conjugated polymer is shown in FIG. 14. Upon first oxidation (increasing applied voltage from 0 to 1.05 V), the intensity of the absorption peak at 387 nm gradually decreases, whereas a new broadband having its maximum absorption wavelength at 1050 nm in the NIR region gradually increases in intensity. When the potential is adjusted to a more positive value of 1.46 V, corresponding to the second oxidation, the broadband with maximum absorption at 1050 nm decreases gradually, and a new broadband with two peaks centered at around 610 nm and 865 nm rises. The observed UV-vis-NIR absorption changes in the conjugated polymer film at various potentials are fully reversible and are associated with strong color changes from original light green to dark green and then to a Prussian blue oxidized form as shown in FIG. 14.

Figure 15:
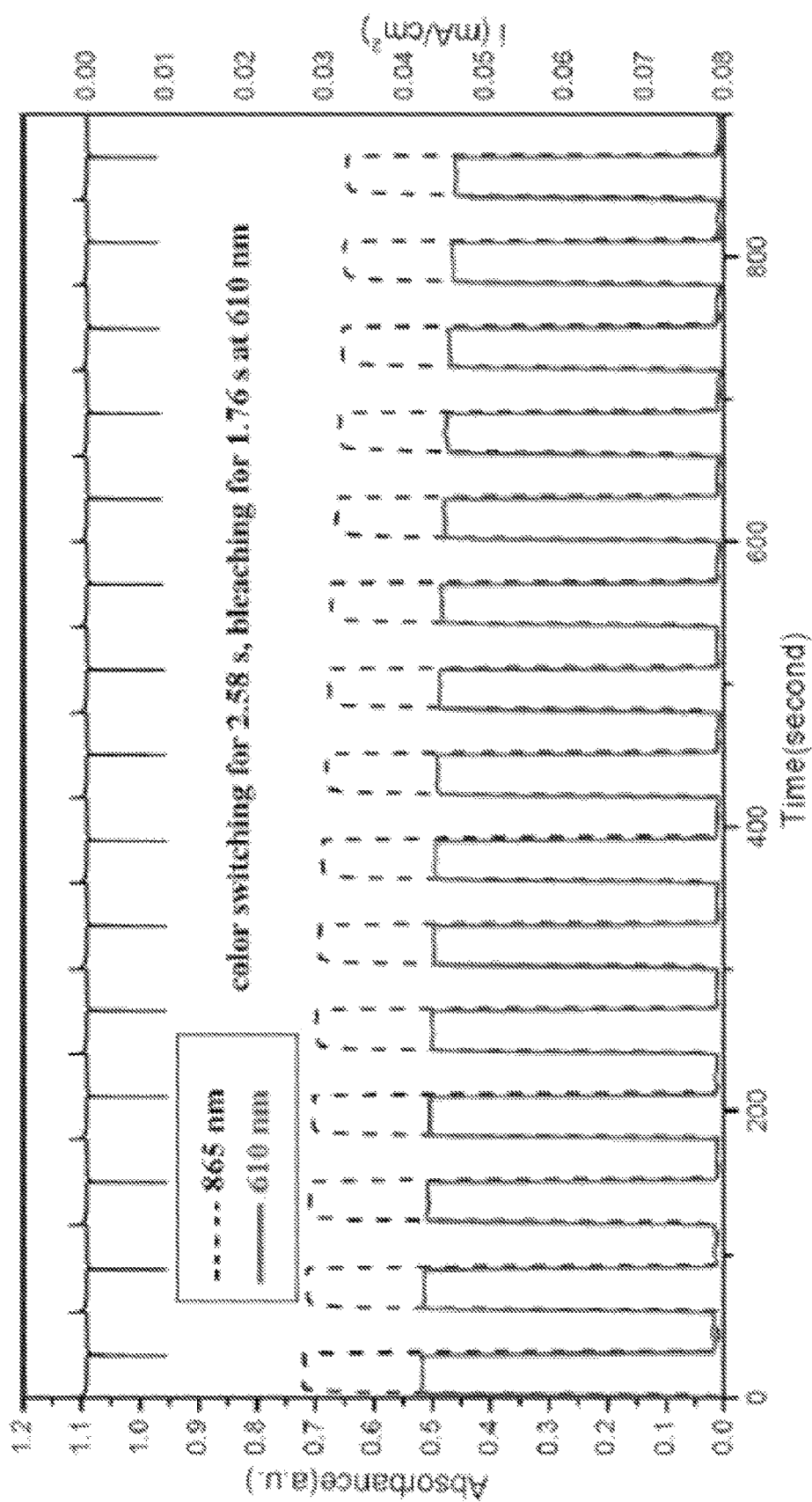
FIG. 15 illustrates current consumption and potential step absorptometry of PBTPAFL (in $CH_3CN$ with 0.1 M TBAP as the supporting electrolyte) by applying a potential step (0.00-1.46 V).

The color switching times are estimated by applying a potential step, and the absorbance profiles are followed (FIG. 15). The switching time is calculated at 90% of the full switch because it is difficult to perceive any further color change with naked eye beyond this point. Thin film of conjugated polymer requires only 2.58 s for switching and 1.76 s for bleaching time at 610 nm. After continuous cyclic scans between 0.0V and 1.46V in 900 seconds, the polymer films still exhibited excellent stability of electrochromic characteristics, which indicates that the film is very stable and has good adhesion with ITO substrate.

V. Copolymer of bis[4-(2-phenyl-2-propyl)phenyl]dioctylfluorene and 2,5-dibromothiophene The copolymer of the present invention is the structure shown in Formula (7). The copolymer is manufactured by utilizing the dibromobenzene compound (BBTPA) shown in Formula (3), the boronic acid compound shown in Formula (4) and the monomer shown in Formula (6) and performing copolymerization in different ratios.

propanediol) ester) (0.8955 mmol), 2,5-dibromothiophene compound (0.806 mmol), 3M potassium carbonate solution ($K_2CO_{3(aq)}$) (2 mL) and toluene (4 mL) are placed into a reaction vessel filled with nitrogen. Then, in step 202, tetrakis (triphenylphosphine)palladium ($Pd(PPh_3)_4$) (3 mmol) is added and the solution mixture is heated to temperature of 100~110° C. (preferably to 105° C.) and is refluxed for 48 hours. Subsequently, in step 203, the polymer solution is deposited in 1 liter of methanol solution. The product is washed with a great amount of water after the solution is filtered. Then, the product is dissolved in toluene again and is deposited in 1 liter of methanol solution and repeat three times. Subsequently, in step 204, the product is heated to temperature 145~155° C. (preferably to 150° C.) under vacuum and is dried for 24 hours.

The absorption peak of the ultraviolet (UV) spectrum of the copolymer [Poly(DITPATH8)] of bis[4-(2-phenyl-2-propyl) phenyl]dioctylfluorene and 2,5-dibromothiophene in tetrahydrofuran (THF) solution is 430 nm. The peak of the photoluminescence (PL) spectrum of the copolymer [Poly (DITPATH8)] of bis[4-(2-phenyl-2-propyl)phenyl] dioctylfluorene and 2,5-dibromothiophene in tetrahydrofuran (THF) solution is 505 nm. The absorption peak of the ultraviolet (UV) spectrum of the copolymer [Poly Formula (6)

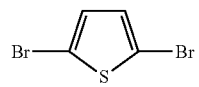

2,5-dibromothiophene

Formula (7)

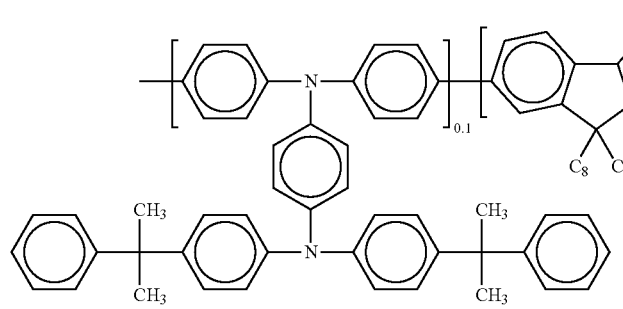

The compound of Formula (7) is the copolymer of bis[4-(2-phenyl-2-propyl)phenyl]dioctylfluorene and 2,5-dibromothiophene.

In one embodiment, "$C_8$" in Formula (7) may also be any one of $C_9$~$C_{12}$ and "0.1" in Formula (7) may also be any one of 0.05~0.15. "0.9" in Formula (7) may also be any one of 0.85~0.95.

Example 2

Figure 11:
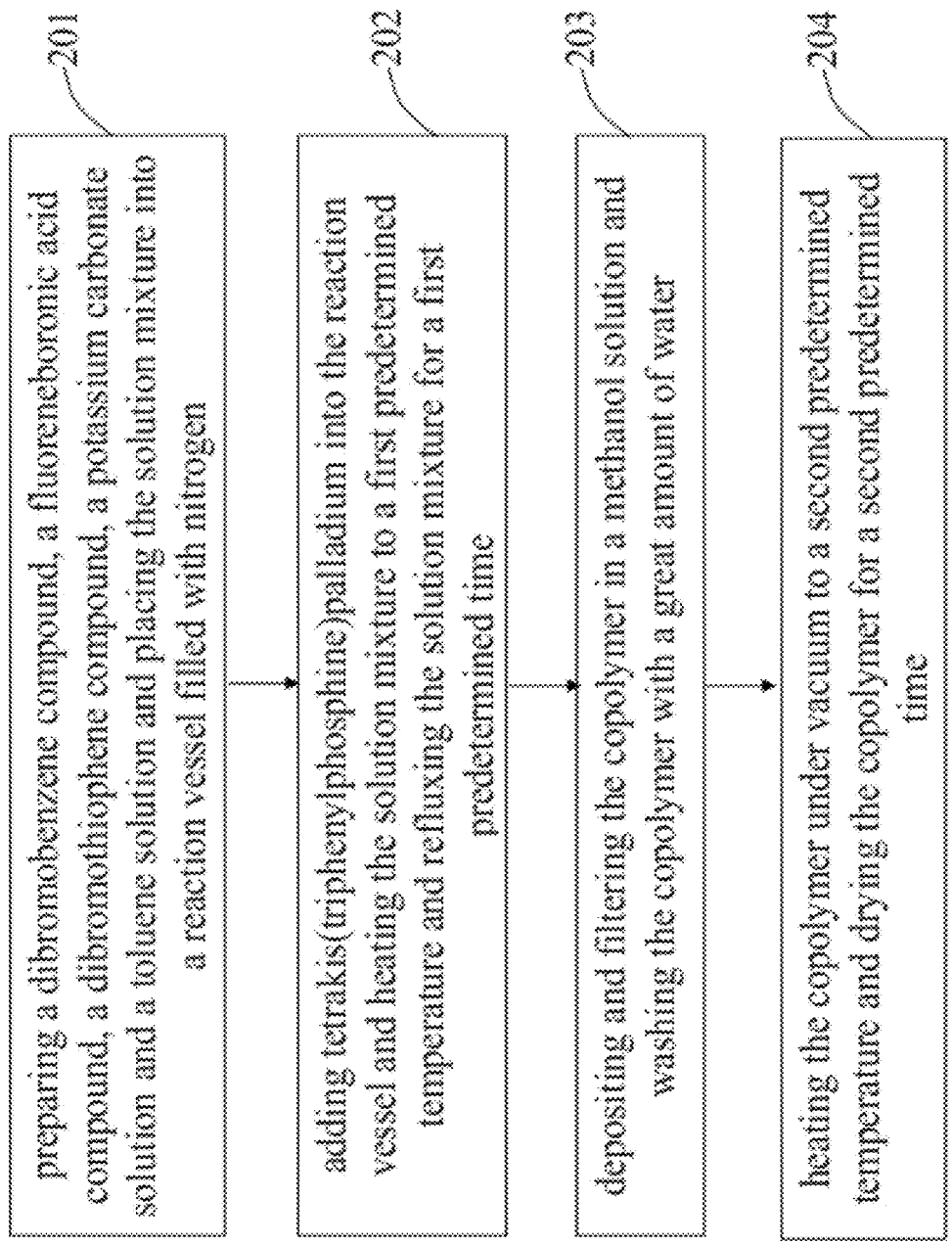
FIG. 11 illustrates the flow diagram of the method for manufacturing copolymer in accordance with one embodiment of the present invention.

Synthesis of the copolymer of bis[4-(2-phenyl-2-propyl)phenyl]dioctylfluorene and 2,5-dibromothiophene As shown in FIG. 11, in step 201, the dibromobenzene compound (BBTPA) (0.0895 mmol), fluoreneboronic acid compound (9,9-dioctylfluorene-2,7-diboronic acid bis(1,3-

(DITPATH8)] of bis[4-(2-phenyl-2-propyl)phenyl]dioctylfluorene and 2,5-dibromothiophene in the solid state is 430 nm. The peak of the photoluminescence (PL) spectrum of the copolymer [Poly(DITPATH8)] of bis[4-(2-phenyl-2-propyl)phenyl]dioctylfluorene and 2,5-dibromothiophene in the solid state is 535 nm.

The foregoing description is a preferred embodiment of the present invention. It should be appreciated that this embodiment is described for purposes of illustration only, not for limiting, and that numerous alterations and modifications may be practiced by those skilled in the art without departing from the spirit and scope of the invention. It is intended that all such modifications and alterations are included insofar as they come within the scope of the invention as claimed or the equivalents thereof.

What is claimed is:

1. A polymer, a monomer of said polymer comprising:
   a bi-triphenylamine functional group having a first end and a second end;
   a fluorene functional group bonded to said first end; and
   at least two phenyl isopropyl group bonded to said second end.

2. The polymer of claim 1, wherein said fluorene functional group comprises the structure shown in Formula (I):

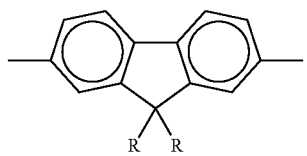

Formula (I)

wherein, R is a C8-C12 alkyl.

3. The polymer of claim 1, wherein thermal degradation temperatures at 10 wt % loss of said polymer under air and under nitrogen are 435° C. and 453° C.

4. The polymer of claim 1, wherein glass transition temperature of said polymer is 137° C.

5. The polymer of claim 1, wherein absorption peak of ultraviolet (UV) spectrum of said polymer in tetrahydrofuran (THF) solution is 313 nm and 387 nm.

6. The polymer of claim 1, wherein peaks of photoluminescence (PL) spectra of said polymer in tetrahydrofuran (THF) solution and in solid state are 451 nm and 466 nm, respectively.

7. The polymer of claim 1, wherein absorption peak of ultraviolet (UV) spectrum of said polymer in solid state is 319 nm and 388 nm.

8. The polymer of claim 1, wherein oxidation potential of said polymer is 4.8 eV.

9. The polymer of claim 1, wherein highest occupied molecular orbital (HOMO) of said polymer is −4.93 eV and lowest unoccupied molecular orbital (LUMO) of said polymer is −2.12 eV.

10. A copolymer comprising the structure shown in Formula (III):

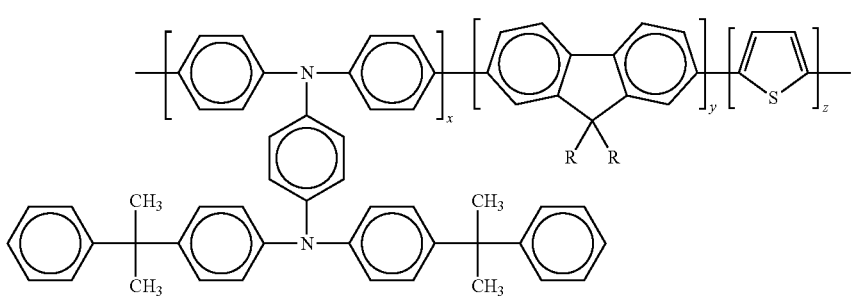

Formula (III)

wherein, R is C8-C12 alkyl; x is 0.05-0.15; y is 1; and z is 0.85-0.95.

11. The copolymer of claim 10, wherein absorption peaks of ultraviolet (UV) spectra of said copolymer in tetrahydrofuran (THF) solution and in solid state are 430 nm.

12. The copolymer of claim 10, wherein peaks of photoluminescence (PL) spectra of said copolymer in tetrahydrofuran (THF) solution and in solid state are 505 nm and 535 nm.

13. A method for manufacturing a polymer of claim 1, comprising:
   preparing a dibromobenzene compound, a fluoreneboronic acid compound, a potassium carbonate solution and a toluene solution and placing the solution mixture into a reaction vessel filled with nitrogen;
   adding tetrakis(triphenylphosphine)palladium into said reaction vessel and heating the solution mixture to a first predetermined temperature and refluxing the solution mixture for a first predetermined time;
   depositing and filtering said polymer in a methanol solution and washing said polymer with a great amount of water; and
   heating said polymer under vacuum to a second predetermined temperature and drying said polymer for a second predetermined time.

14. The method of claim 13, wherein said first predetermined temperature is 100-110° C. and said first predetermined time is 48 hours.

15. The method of claim 13, wherein said second predetermined temperature is 145-155° C. and said second predetermined time is 24 hours.

16. A method for manufacturing a copolymer of claim 10, comprising:
   preparing a dibromobenzene compound, a fluoreneboronic acid compound, a dibromothiophene compound, a potassium carbonate solution and a toluene solution and placing the solution mixture into a reaction vessel filled with nitrogen;
   adding tetrakis(triphenylphosphine)palladium into said reaction vessel and heating the solution mixture to a first predetermined temperature and refluxing the solution mixture for a first predetermined time;
   depositing and filtering said copolymer in a methanol solution and washing said copolymer with a great amount of water; and
   heating said copolymer under vacuum to a second predetermined temperature and drying said copolymer for a second predetermined time.

17. The method of claim 16, wherein said first predetermined temperature is 100-110° C. and said first predetermined time is 48 hours.

18. The method of claim 16, wherein said second predetermined temperature is 145-155° C. and said second predetermined time is 24 hours.

* * * * *